US011922965B2

(12) United States Patent
Yasuda et al.

(10) Patent No.: US 11,922,965 B2
(45) Date of Patent: Mar. 5, 2024

(54) DIRECTION OF ARRIVAL ESTIMATION APPARATUS, MODEL LEARNING APPARATUS, DIRECTION OF ARRIVAL ESTIMATION METHOD, MODEL LEARNING METHOD, AND PROGRAM

(71) Applicant: NIPPON TELEGRAPH AND TELEPHONE CORPORATION, Tokyo (JP)

(72) Inventors: Masahiro Yasuda, Tokyo (JP); Yuma Koizumi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 73 days.

(21) Appl. No.: 17/639,675

(22) PCT Filed: Feb. 4, 2020

(86) PCT No.: PCT/JP2020/004011
§ 371 (c)(1),
(2) Date: Mar. 2, 2022

(87) PCT Pub. No.: WO2021/044647
PCT Pub. Date: Mar. 11, 2021

(65) Prior Publication Data

US 2022/0301575 A1 Sep. 22, 2022

(30) Foreign Application Priority Data

Sep. 4, 2019 (WO) .................. PCT/JP2019/034829

(51) Int. Cl.
*G10L 21/0232* (2013.01)
*G10L 21/0208* (2013.01)
(Continued)

(52) U.S. Cl.
CPC .......... *G10L 21/0232* (2013.01); *G10L 25/18* (2013.01); *G10L 25/30* (2013.01);
(Continued)

(58) Field of Classification Search
None
See application file for complete search history.

(56) References Cited

U.S. PATENT DOCUMENTS

2013/0170319 A1* 7/2013 Kallinger ................ G01S 3/802 367/118

OTHER PUBLICATIONS

Xu et al. (2017) "Surrey-CVSSP system for dcase2017 challenge task4" Detection and Classification of Acoustic Scenes and Events.
(Continued)

*Primary Examiner* — Kenny H Truong

(57) ABSTRACT

A direction-of-arrival estimation device for achieving direction-of-arrival estimation which is robust against an SNR and in which an application range of a learning model is specific is provided. The device includes: a reverberation output unit configured to receive input of a real spectrogram extracted from a complex spectrogram of acoustic data and an acoustic intensity vector extracted from the complex spectrogram, and output an estimated reverberation component of the acoustic intensity vector; a noise suppression mask output unit configured to receive input of the real spectrogram and the acoustic intensity vector from which the reverberation component has been subtracted, and output a time frequency mask for noise suppression; and a sound source direction-of-arrival derivation unit configured to derive a sound source direction-of-arrival based on an acoustic intensity vector formed by applying the time frequency mask to the acoustic intensity vector from which the reverberation component has been subtracted.

20 Claims, 11 Drawing Sheets

(51) Int. Cl.
*G10L 21/0216* (2013.01)
*G10L 25/18* (2013.01)
*G10L 25/30* (2013.01)
*H04R 1/40* (2006.01)
*H04R 3/00* (2006.01)

(52) U.S. Cl.
CPC ............ *H04R 1/406* (2013.01); *H04R 3/005* (2013.01); *G10L 2021/02082* (2013.01); *G10L 2021/02166* (2013.01); *H04R 2201/401* (2013.01)

(56) References Cited

OTHER PUBLICATIONS

Lee et al. (2017) "Ensemble of convolutional neural networks for weakly-supervised sound event detection using multiple scale input" Detection and Classification of Acoustic Scenes and Events.

Chang et al. (2018) "Feature extracted DOA estimation algorithm using acoustic array for drone surveillance" IEEE 87th Vehicular Technology Conference, Jun. 3, 2018.

Knapp et al. (1976) "The generalized correlation method for estimation of time delay" IEEE Transactions on Acoustics, Speech, and Signal Processing, vol. ASSP-24, No. 4, pp. 320-327.

Ralph O. Schmidt (1986) "Multiple emitter location and signal parameter estimation" IEEE Transactions on Antennas and Propagation, vol. AP-34, No. 3, pp. 276-280.

Ahonen et al. (2007) "Teleconference application and B-format microphone array for directional audio coding" AES 30th International Conference, Mar. 15, 2007.

Kitić et al. (2018) "Tramp: Tracking by a realtime ambisonic-based particle filter" LOCATA Challenge Workshop, a satellite event of IWAENC, Sep. 17, 2018.

Liu et al. (2018) "Direction-of-arrival estimation based on deep neural networks with robustness to array imperfections" IEEE Transactions on Antennas and Propagation, vol. 66, No. 12, pp. 7315-7327.

Adavanne et al. (2018) "Direction of arrival estimation for multiple sound sources using convolutional recurrent neural network" 2018 26th European Signal Processing Conference(EUSIPCO), Sep. 3, 2018.

Adavanne et al. (2019) "Sound event localization and detection of overlapping sources using convolutional recurrent neural networks" IEEE Journal of Selected Topics in Signal Processing, vol. 13, No. 1.

Adavanne et al. (2019) "A multi-room reverberant dataset for sound event localization and detection" literature, May 24, 2019.

Nguyen et al. (2019) "Dcase 2019 task 3: A two-step system for sound event localization and detection" Detection and Classification of Acoustic Scenes and Events.

Kapka et al. (2019) "Sound source detection, localization and classification using consecutive ensemble of CRNN models" Detection and Classification of Acoustic Scenes and Events.

Cao et al. (2019) "Two-stage sound event localization and detection using intensity vector and generalized cross-correlation" Detection and Classification of Acoustic Scenes and Events.

Jarrett et al. (2010) "3D source localization in the spherical harmonic domain using a pseudointensity vector" European Signal Processing Conference, Aug. 23, 2010.

AASP Challenges (2019) "DCASE2019 Challenge" IEEE Signal Processing Society [online] website: http://dcase.community/challenge2019/index.

Yasuda et al. (2019) "DOA Estimation by DNN-Based Denoisingand Dereverberation From Sound Intensity Vector" literature [online] website: https://arxiv.org/abs/1910.04415.

* cited by examiner

DIRECTION OF ARRIVAL ESTIMATION APPARATUS, MODEL LEARNING APPARATUS, DIRECTION OF ARRIVAL ESTIMATION METHOD, MODEL LEARNING METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/004011, filed on 4 Feb. 2020, which application claims priority to and the benefit of International Application No. PCT/JP2019/034829, filed on 4 Sep. 2019, the disclosures of which are hereby incorporated herein by reference in their entireties.

TECHNICAL FIELD

The present invention relates to a direction-of-arrival estimation device, a model learning device, a direction-of-arrival estimation method, a model learning method and a program, relating to a sound source direction-of-arrival (DOA) estimation.

BACKGROUND ART

Sound source direction-of-arrival (DOA) estimation is one of the important technologies for AI (artificial intelligence) to understand a surrounding environment. For example, for implementation of a self-driving car, a method capable of autonomously acquiring an ambient environment is essential (Non-Patent Literatures 1 and 2), and the DOA estimation is the dominant means. In addition, it has been examined to use a DOA estimation device using a microphone array loaded on a drone as a monitoring system for a crime or the like (Non-Patent Literature 3).

Methods of the DOA estimation can be roughly classified into two of a physical base (Non-Patent Literatures 4, 5, 6 and 7) and a machine learning base (Non-Patent Literatures 8, 9, 10 and 11). As the physical-based method, a method based on a time difference of arrival (TDOA), a generalized cross-correlation method (GCC-PHAT) accompanied by phase transform, and a subspace method such as MUSIC or the like have been proposed. As the machine learning-based method, many methods using a DNN have been proposed in recent years. For example, a combination of an autoencoder and a classifier (Non-Patent Literature 8) and a combination of a convolutional neural network (CNN) and a recurrent neural network (RNN) (Non-Patent Literatures 9, 10 and 11) have been proposed.

Both physical-based and DNN-based methods have merits and demerits. The physical-based method can generally perform accurate DOA estimation when sound source count is known. Actually, a parametric-based DOA estimation method has shown low DOAerror (DE) in Task 3 of DCASE2019 Challenge (Non-Patent Literature 12). However, since the methods use many time frames for the DOA estimation, time series analysis and angle estimation accuracy are in a tradeoff relation. The DOA estimation using a sound intensity vector (IV) (Non-Patent Literatures 6 and 7) has dissolved the tradeoff and enabled the time series analysis with an excellent angular resolution.

CITATION LIST

Non-Patent Literature

Non-Patent Literature 1: Y. Xu, Q. Kong, W. Wang, and M. D. Plumbley, "Surrey-cvssp system for dcase2017 challenge task4," in Tech. report of Detection and Classification of Acoustic Scenes and Events 2017 (DCASE) Challenge, 2017.

Non-Patent Literature 2: D. Lee, S. Lee, Y. Han, and K. Lee, "Ensemble of convolutional neural networks for weakly-supervised sound event detection using multiple scale input," in Tech. report of Detection and Classification of Acoustic Scenes and Events 2017 (DCASE) Challenge, 2017.

Non-Patent Literature 3: X. Chang, C. Yang, X. Shi, P. Li, Z. Shi, and J. Chen, "Feature extracted doa estimation algorithm using acoustic array for drone surveillance," in Proc. of IEEE 87th Vehicular Technology Conference, 2018.

Non-Patent Literature 4: C. Knapp and G. Carter, "The generalized correlation method for estimation of time delay," IEEE Transactions on Acoustics, Speech, and Signal Processing, vol. 24, pp. 320-327, 1976.

Non-Patent Literature 5: R. O. Schmidt, "Multiple emitter location and signal parameter estimation," IEEE Transactions on Antennas and Propagation, vol. 34, pp. 276-280, 1986.

Non-Patent Literature 6: J. Ahonen, V. Pulkki, and T. Lokki, "Teleconference application and b-format microphone array for directional audio coding," in Proc. of AES 30th International Conference: Intelligent Audio Environments, 2007.

Non-Patent Literature 7: S. Kitic and A. Guerin, "Tramp: Tracking by a real-time ambisonic-based particle filter," in Proc. of LOCATA Challenge Workshop, a satellite event of IWAENC, 2018.

Non-Patent Literature 8: Z. M. Liu, C. Zhang, and P. S. Yu, "Direction-of-arrival estimation based on deep neural networks with robustness to array imperfections," IEEE Transactions on Antennas and Propagation, vol. 66, pp. 7315-7327, 2018.

Non-Patent Literature 9: S. Adavanne, A. Politis, and T. Virtanen, "Direction of arrival estimation for multiple sound sources using convolutional recurrent neural network," in Proc. of IEEE 26th European Signal Processing Conference, 2018.

Non-Patent Literature 10: S. Adavanne, A. Politis, J. Nikunen, and T. Virtanen, "Sound event localization and detection of overlapping sources using convolutional recurrent neural networks," arXiv:1807.00129v3, 2018.

Non-Patent Literature 11: S. Adavanne, A. Politis, and T. Virtanen, "multi-room reverberant dataset for sound event localization and detection," arXiv:1905.08546v2, 2019.

Non-Patent Literature 12: T. N. T. Nguyen, D. L. Jones, R. Ranjan, S. Jayabalan, and W. S. Gan, "Dcase 2019 task 3: A two-step system for sound event localization and detection," in Tech. report of Detection and Classification of Acoustic Scenes and Events 2019 (DCASE) Challenge, 2019.

Non-Patent Literature 13: S. Kapka and M. Lewandowski, "Sound source detection, localization and classification using consecutive ensemble of crnn models," in Tech. report of Detection and Classification of Acoustic Scenes and Events 2019 (DCASE) Challenge, 2019.

Non-Patent Literature 14: Y. Cao, T. Iqbal, Q. Kong, M. B. Galindo, W. Wang, and M. D. Plumbley, "Two-stage sound event localization and detection using intensity vector and generalized cross-correlation," in Tech. report of Detection and Classification of Acoustic Scenes and Events 2019 (DCASE) Challenge, 2019.

Non-Patent Literature 15: D. P. Jarrett, E. A. P. Habets, and P. A. Naylor, "3d source localization in the spherical harmonic domain using a pseudointensity vector," in Proc. of European Signal Processing Conference, 2010.

Non-Patent Literature 16: "DCASE2019 Workshop-Workshop on Detection and Classification of Acoustic Scenes and Events," [online], [searched on Aug. 21, 2019], Internet <URL: http://dcase.community/workshop2019/>

SUMMARY OF THE INVENTION

Technical Problem

However, the accuracy is strongly affected by a signal-to-noise ratio (SNR) corresponding to noise and room reverberation. On the other hand, the DNN-based DOA estimation method which is robust against the SNR has been proposed (Non-Patent Literatures 9, 13 and 14).

However, since acoustic processing by a DNN is a black box, it is impossible to recognize what kind of properties a DNN model acquires by learning. Therefore, it is difficult to determine an application range of a learning model.

Accordingly, an object of the present invention is to provide a direction-of-arrival estimation device for achieving direction-of-arrival estimation which is robust against an SNR and in which an application range of a learning model is specific.

Means for Solving the Problem

The direction-of-arrival estimation device of the present invention includes a reverberation output unit, a noise suppression mask output unit, and a sound source direction-of-arrival derivation unit. The reverberation output unit receives input of a real spectrogram extracted from a complex spectrogram of acoustic data and an acoustic intensity vector extracted from the complex spectrogram, and outputs an estimated reverberation component of the acoustic intensity vector. The noise suppression mask output unit receives input of the real spectrogram and the acoustic intensity vector from which the reverberation component has been subtracted, and outputs a time frequency mask for noise suppression. The sound source direction-of-arrival derivation unit derives a sound source direction-of-arrival based on an acoustic intensity vector formed by applying the time frequency mask to the acoustic intensity vector from which the reverberation component has been subtracted.

Effects of the Invention

According to the direction-of-arrival estimation device of the present invention, the direction-of-arrival estimation which is robust against the SNR and in which the application range of a learning model is specific can be achieved.

DESCRIPTION OF EMBODIMENTS

Figure 1:
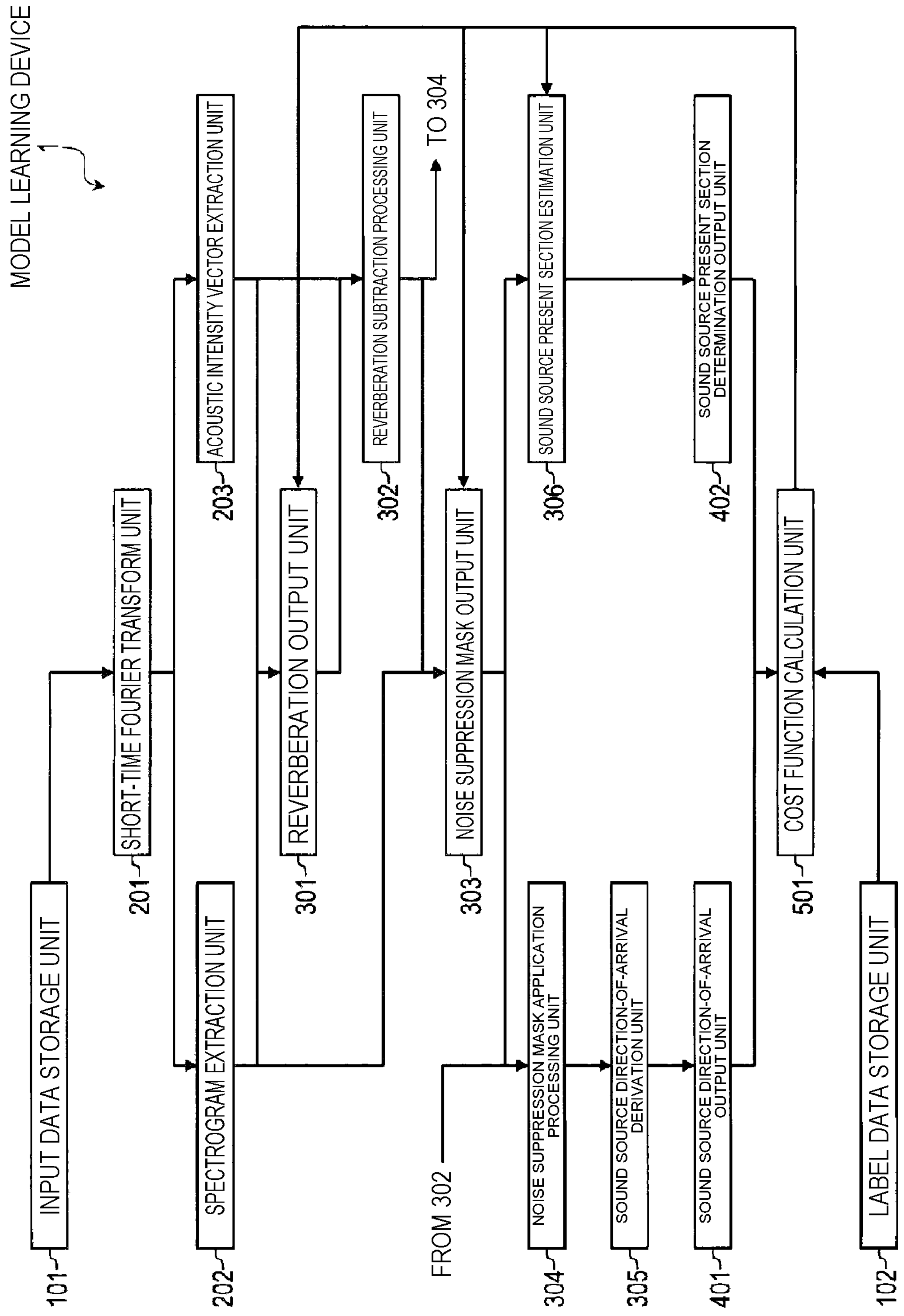
FIG. 1 is a block diagram illustrating a configuration of a model learning device of an embodiment 1.

Hereinafter, embodiments of the present invention will be described in detail. Note that same numbers are attached to components having the same functions, and redundant description is omitted.

Embodiment 1

A model learning device and a direction-of-arrival estimation device of the embodiment 1 improve accuracy of DOA estimation by an IV obtained from signals of an FOA format by reverberation removal and noise suppression using a DNN. The model learning device and the direction-of-arrival estimation device of the embodiment 1 use three DNNs in combination, which are an estimation model (RIVnet) of a reverberation component of an acoustic pressure intensity vector, an estimation model (MASKnet) of a time frequency mask for the noise suppression, and an estimation model (SADnet) of sound source presence/absence. The model learning device and the direction-of-arrival estimation device of the present embodiment perform the DOA estimation for a case where a plurality of sound sources do not simultaneously exist within an identical time section.

<Preparation>

Hereinafter, the prior art used in the embodiment will be described.

<DOA Estimation Based on Acoustic Intensity Vector>

Ahonen and others have proposed a DOA estimation method using the IV calculated from a first-order ambisonics B format (Non-Patent Literature 6). The first-order ambisonics B format is configured by 4-channel signals, and output $W_{f,t}$, $X_{f,t}$, $Y_{f,t}$ and $Z_{f,t}$ of the short-time Fourier transform (STFT) correspond to zero-order and first-order spherical harmonics. Here, $f \in \{1, \ldots, F\}$ and $t \in \{1, \ldots, T\}$ are indexes of a frequency and time of a T-F domain respectively. The zero-order $W_{f,t}$ corresponds to an omnidirectional sound source, and the first-order $X_{f,t}$, $Y_{f,t}$, $Z_{f,t}$ correspond to a dipole along each axis respectively.

Spatial responses (steering vectors) of $W_{f,t}$, $X_{f,t}$, $Y_{f,t}$ and $Z_{f,t}$ are defined as follows respectively.

$$H^{(W)}(\varphi,\theta,f)=3^{-1/2},$$

$$H^{(X)}(\varphi,\theta,f)=\cos\varphi*\cos\theta,$$

$$H^{(Y)}(\varphi,\theta,f)=\sin\varphi*\cos\theta,$$

$$H^{(Z)}(\varphi,\theta,f)=\sin\theta \quad (1)$$

Here, φ and θ indicate an azimuth angle and an elevation angle respectively. The IV is a vector determined by an acoustic particle velocity $v=[v_x,v_y,v_z]^T$ and an acoustic pressure $p_{f,t}$, and is indicated as follows in a T-F space.

$$I_{f,t}=\tfrac{1}{2}R(p^*_{f,t}\cdot v_{f,t}) \quad (2)$$

Here, R(•) indicates a real part of a complex number, and * indicates a complex conjugate. Actually, since it is impossible to measure the acoustic particle velocity and the acoustic pressure at all points on the space, it is difficult to obtain the IV by applying Expression (2) as it is. Accordingly, a 4-channel spectrogram obtained from the first-order ambisonics B format is used, and Expression (2) is approximated as follows and turned to Expression (3) (Non-Patent Literature 15).

[Math. 1]

$$I_{f,t} \propto R\left(W_{f,t}^{*}\begin{bmatrix} X_{f,t} \\ Y_{f,t} \\ Z_{f,t} \end{bmatrix}\right) = \begin{bmatrix} I_{X,f,t} \\ I_{Y,f,t} \\ I_{Z,f,t} \end{bmatrix} \tag{3}$$

In order to select a time-frequency domain effective for the DOA estimation, Ahonen and others have applied a time frequency mask $M_{f,t}$ as below to the IV. Note that $\rho_0$ is an air density and c is an acoustic velocity.

[Math. 2]

$$M_{f,t} = \frac{1}{2\rho_0 c^2}\left(|W_{f,t}|^2 + \frac{|X_{f,t}|^2 + |Y_{f,t}|^2 + |Z_{f,t}|^2}{3}\right) \tag{4}$$

The mask selects a time frequency bin which is a signal intensity and has a great intensity. Therefore, when it is assumed that object signals have the intensity sufficiently greater than environmental noise, the time frequency mask selects the time-frequency domain effective for the DOA estimation. Further, they calculate a time series of the IV for each Bark scale within a domain of 300-3400 Hz as follows.

[Math. 3]

$$I_t = \frac{\sum_{f=f_l}^{f=f_h} I_{f,t}\cdot M_{f,t}}{(f_h - f_l)\sum_{f=f_l}^{f=f_h} M_{f,t}} = \begin{bmatrix} I_{X,t} \\ I_{Y,t} \\ I_{Z,t} \end{bmatrix} \tag{5}$$

Here, $f_l$ and $f_h$ indicate an upper limit and a lower limit of each Bark scale. Finally, the azimuth angle and the elevation angle of an object sound source in each time frame t are calculated as follows.

[Math. 4]

$$\phi_t = \arctan\left(\frac{I_{Y,t}}{I_{X,t}}\right), \quad \theta_t = \arctan\left(\frac{I_{Z,t}}{\sqrt{I_{X,t}^2 + I_{Y,t}^2}}\right) \tag{6}$$

<DOA Estimation Based on DNN>

Adavanne and others have proposed some DOA estimation methods using the DNN (Non-Patent Literatures 9, 10 and 11). Among them, the method of combining two convolutional neural network (CNN)-based DNNs will be described. It is a combination of a signal processing framework and the DNN. In a first DNN, a spatial pseudo spectrum (SPS) is estimated as a regression problem. Input features are an amplitude and a phase of a spectrogram obtained by the short-time Fourier transform (STFT) of the 4-channel signals of the first-order ambisonics B format. In a second DNN, the DOA is estimated as a classification task at a 10° interval. The input of the network is the SPS acquired in the first DNN. Since both DNNs are configured by the combination of a multilayer CNN and a bidirectional gated recurrent neural network (Bi-GRU), high order feature extraction and modeling of a time structure are possible.

<DOA Estimation Improving Accuracy Using Reverberation Removal and Noise Suppression Using DNN>

The present embodiment provides the model learning device and the direction-of-arrival estimation device capable of the DOA estimation which improves accuracy of the DOA estimation based on the IV using the reverberation removal and the noise suppression using the DNN. Generally, input signals x of a time domain can be indicated as follows.

$$x = x^s + x^r + x^n \tag{7}$$

Here, $x^s$, $x^r$ and $x^n$ indicate direct sound, reverberation and a noise component, respectively. Similarly, a time frequency expression $x_{t,f}$ can be also indicated as a sum of the direct sound, the reverberation and the noise component. Thus, by applying the expression to Expression (3), the following expression is obtained.

$$I_{f,t} = I^s_{f,t} + I^r_{f,t} + I^n_{f,t} \tag{8}$$

As recognized from Expression (8), since the IV obtained from observed signals contain three components, a time series $I_t$ of the IV derived from there is affected not only by the direct sound but also the reverberation and the noise. It is one of the reasons why the conventional method is not robust against the reverberation and the noise.

In order to overcome a disadvantage of the conventional method, the reverberation removal by subtraction of an estimated reverberation component $\hat{I}^r_{f,t}$ of the IV and the noise suppression by application of the time frequency mask $M_{f,t}$ are performed. This operation can be indicated as follows.

[Math. 5]

$$I_t^s = \sum_f M_{f,t}\left(I_{f,t} - \hat{I}^r_{f,t}\right) \tag{9}$$

In the present embodiment, the reverberation component $\hat{I}^r_{f,t}$ of the IV and the time frequency mask $M_{f,t}$ are estimated by the two DNNs.

<Model Learning Device 1>

Hereinafter, a functional configuration of the model learning device 1 of the embodiment 1 will be described with reference to FIG. 1. As illustrated in the figure, the model learning device 1 of the present embodiment includes an input data storage unit 101, a label data storage unit 102, a short-time Fourier transform unit 201, a spectrogram extraction unit 202, an acoustic intensity vector extraction unit 203, a reverberation output unit 301, a reverberation subtraction processing unit 302, a noise suppression mask output unit 303, a noise suppression mask application processing unit 304, a sound source direction-of-arrival derivation unit 305, a sound source present section estimation unit 306, a sound source direction-of-arrival output unit 401, a sound source present section determination output unit 402, and a cost function calculation unit 501. Hereinafter, operations of the respective components will be described with reference to FIG. 2.

<Input Data Storage Unit 101>

As input data, 4-channel acoustic data of the first-order ambisonics B format to be used for learning, for which a sound source direction-of-arrival at each time is known, is prepared, and stored in the input data storage unit 101 beforehand. The acoustic data to be used may be voice signals or may be acoustic signals other than voice signals. Note that the acoustic data to be used does not always need to be limited to an ambisonics form, and may be general microphone array signals. In the present embodiment, the acoustic data not including a plurality of sound sources in the same time section is used.

<Label Data Storage Unit 102>

Label data indicating the sound source direction-of-arrival and the time of each acoustic event, which corresponds to the input data in the input data storage unit 101, is prepared and stored in the label data storage unit 102 beforehand.

<Short-Time Fourier Transform Unit 201>

The short-time Fourier transform unit 201 executes the STFT to the input data in the input data storage unit 101, and acquires a complex spectrogram (S201).

<Spectrogram Extraction Unit 202>

The spectrogram extraction unit 202 uses the complex spectrogram acquired in step S201, and extracts a real spectrogram to be used as an input feature amount of the DNN (S202). The spectrogram extraction unit 202 can use a log-mel spectrogram, for example.

<Acoustic Intensity Vector Extraction Unit 203>

The acoustic intensity vector extraction unit 203 uses the complex spectrogram obtained in step S201, and extracts an acoustic intensity vector to be used as the input feature amount of the DNN according to Expression (3) (S203).

<Reverberation Output Unit 301 (RIVnet)>

The reverberation output unit 301 receives input of the real spectrogram and the acoustic intensity vector, and outputs the estimated reverberation component of the acoustic intensity vector (S301). In more detail, the reverberation output unit 301 estimates a reverberation component $I^r_{f,t}$ of the acoustic intensity vector by a DNN-based reverberation component estimation model (RIVnet) of the acoustic pressure intensity vector (S301). The reverberation output unit 301 can use a DNN model for which a multilayer CNN and a bidirectional long short-time memory recurrent neural network (Bi-STFT) are combined, for example.

<Reverberation Subtraction Processing Unit 302>

The reverberation subtraction processing unit 302 performs processing of subtracting the $I^r_{f,t}$ estimated in step S301 from the acoustic intensity vector obtained in step S203 (S302).

<Noise Suppression Mask Output Unit 303 (MASKnet)>

The noise suppression mask output unit 303 receives input of the real spectrogram and the acoustic intensity vector from which the reverberation component has been subtracted, and outputs the time frequency mask for the noise suppression (S303). In more detail, the noise suppression mask output unit 303 estimates the time frequency mask $M_{f,t}$ for the noise suppression by a DNN-based time frequency mask estimation model (MASKnet) for the noise suppression (S303). The noise suppression mask output unit 303 can use a DNN model having a structure similar to the reverberation output unit 301 (RIVnet) except an output unit, for example.

<Noise Suppression Mask Application Processing Unit 304>

The noise suppression mask application processing unit 304 multiplies the time frequency mask $M_{f,t}$ obtained in step S303 with the reverberation-subtracted acoustic intensity vector obtained in step S302 (S304).

<Sound Source Direction-Of-Arrival Derivation Unit 305>

The sound source direction-of-arrival derivation unit 305 derives the sound source direction-of-arrival (DOA) by Expression (6), based on the acoustic intensity vector formed by applying the time frequency mask to the reverberation-component-subtracted acoustic intensity vector, which is obtained in step S304 (S305).

<Sound Source Present Section Estimation Unit 306 (SADnet)>

The sound source present section estimation unit 306 estimates a sound source present section by a DNN model (SADnet) (S306). For example, the sound source present section estimation unit 306 may branch an output layer of the noise suppression mask output unit 303 (MASKnet), and execute the SADnet.

<Sound Source Direction-Of-Arrival Output Unit 401>

The sound source direction-of-arrival output unit 401 outputs time series data of a pair of an azimuth angle $\varphi$ and an elevation angle $\theta$ indicating the sound source direction-of-arrival (DOA) derived in step S305 (S401).

<Sound Source Present Section Determination Output Unit 402 (SAD)>

The sound source present section estimation unit 402 outputs time series data which is a result of sound source present section determination estimated in the sound source present section estimation unit 306, and takes a value 1 in a sound source present section and a value 0 otherwise (S402).

<Cost Function Calculation Unit 501>

The cost function calculation unit 501 updates a parameter used for association based on the derived sound source direction-of-arrival and the label stored beforehand in the label data storage unit 102 (S501). In more detail, the cost function calculation unit 501 calculates a cost function of DNN learning based on the sound source direction-of-arrival derived in step S401, the result of the sound source present section determination in step S402, and the label stored beforehand in the label data storage unit 102, and updates the parameter of the DNN model in a direction where the cost function becomes small (S501).

The cost function calculation unit 501 can use a sum of a cost function for the DOA estimation and a cost function for SAD estimation, as a cost function for example. Mean Absolute Error (MAE) between a true DOA and an estimated DOA can be the cost function for the DOA estimation, and Binary Cross Entropy (BCE) between a true SAD and an estimated SAD can be the cost function for the SAD estimation.

<Stop Condition>

Figure 2:
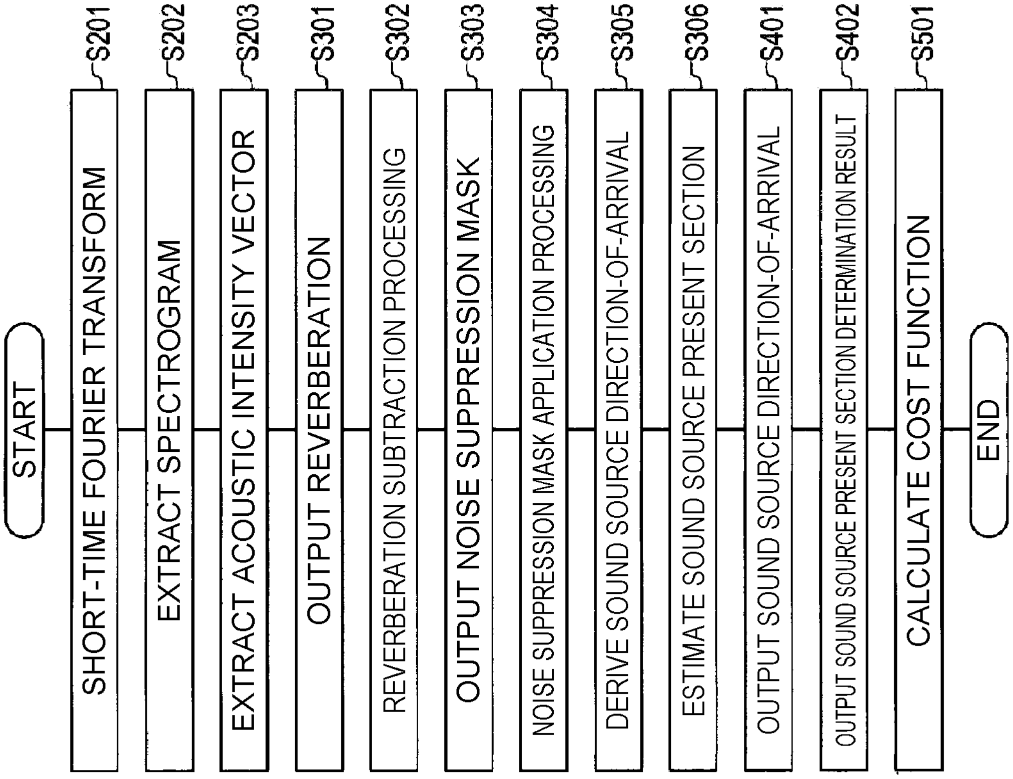
FIG. 2 is a flowchart illustrating an operation of the model learning device of the embodiment 1.

Though a notation of a stop condition is omitted in a flowchart in FIG. 2, the stop condition may be set like stopping learning when a DNN parameter is updated for 10000 times for example.

<Direction-Of-Arrival Estimation Device 2>

Figure 3:
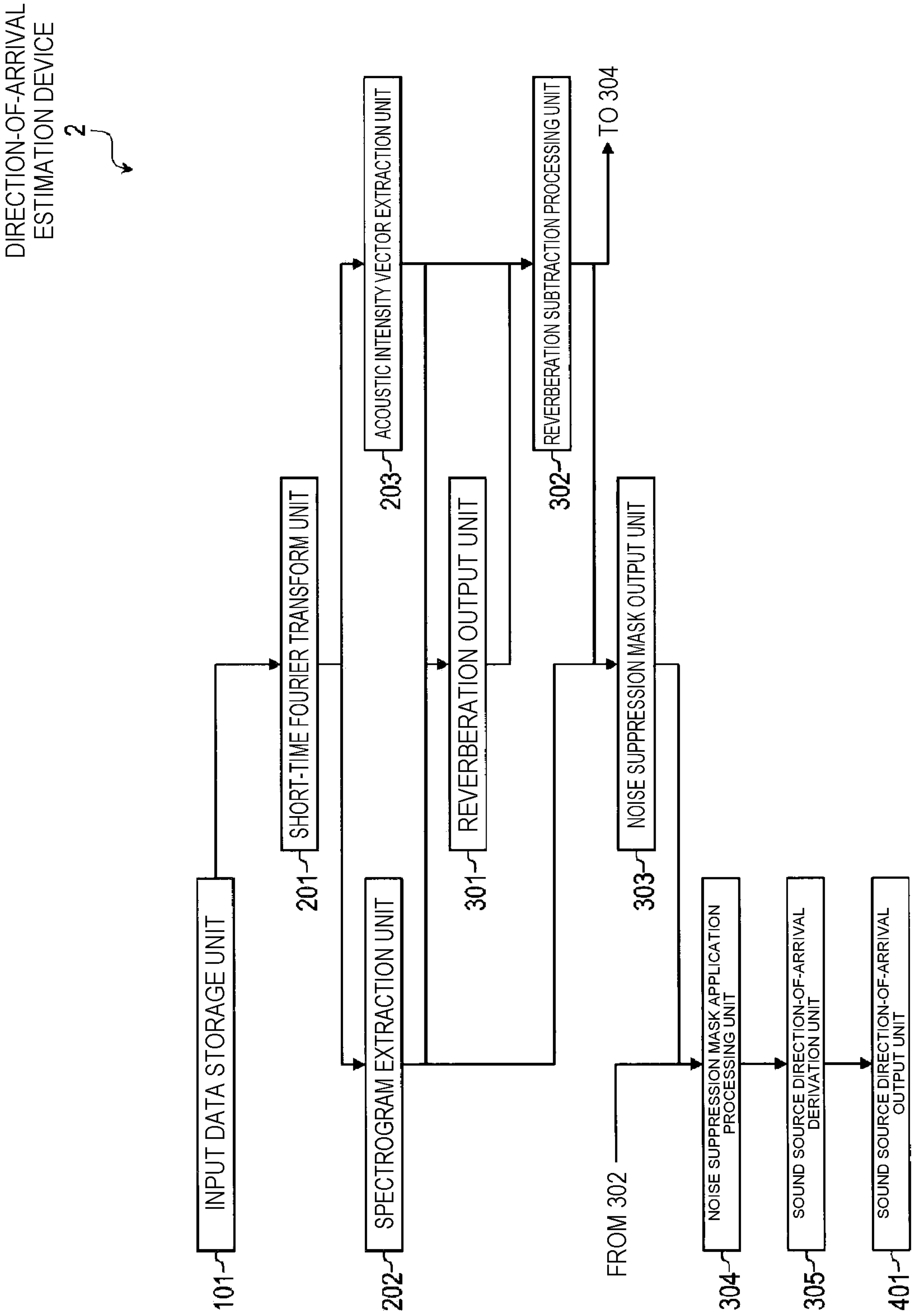
FIG. 3 is a block diagram illustrating a configuration of a direction-of-arrival estimation device of the embodiment 1.

As illustrated in FIG. 3, by a similar configuration, not the learning device but a device which estimates a direction-of-arrival of acoustic data for which the direction-of-arrival is unknown can be achieved. The direction-of-arrival estimation device 2 of the present embodiment includes the input data storage unit 101, the short-time Fourier transform unit 201, the spectrogram extraction unit 202, the acoustic intensity vector extraction unit 203, the reverberation output unit 301, the reverberation subtraction processing unit 302, the noise suppression mask output unit 303, the noise suppression mask application processing unit 304, the sound source direction-of-arrival derivation unit 305, and the sound source direction-of-arrival output unit 401. The label data storage unit 102, the sound source present section estimation unit 306, the sound source present section determination output unit 402 and the cost function calculation unit 501 which are the configuration needed for model learning are omitted from the present device. In addition, the device is different from the model learning device 1 at a point of preparing the acoustic data for which the direction-of-arrival is unknown (to which the label is not imparted) as input data.

Figure 4:
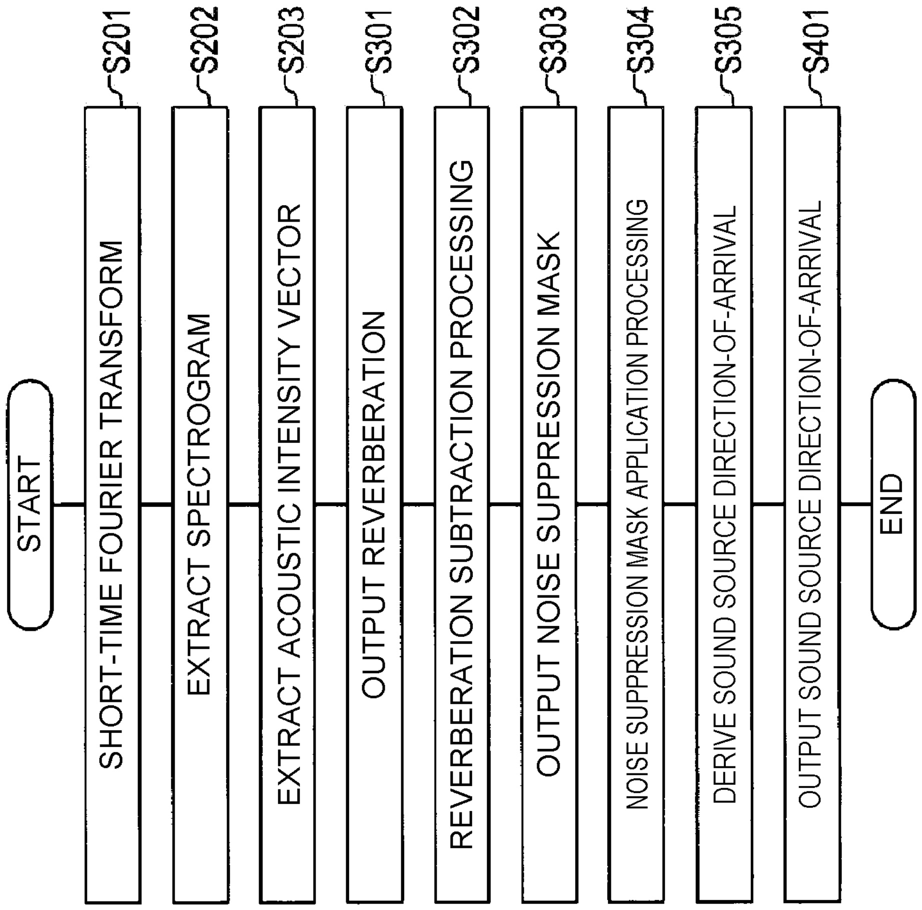
FIG. 4 is a flowchart illustrating an operation of the direction-of-arrival estimation device of the embodiment 1.

As illustrated in FIG. 4, the respective components of the direction-of-arrival estimation device 2 execute already described steps S201, S202, S203, S301, S302, S303, S304, S305 and S401 to the acoustic data for which the direction-of-arrival is unknown, and derive the sound source direction-of-arrival.

<Experimental Result of DOA Estimation>

Figure 5:
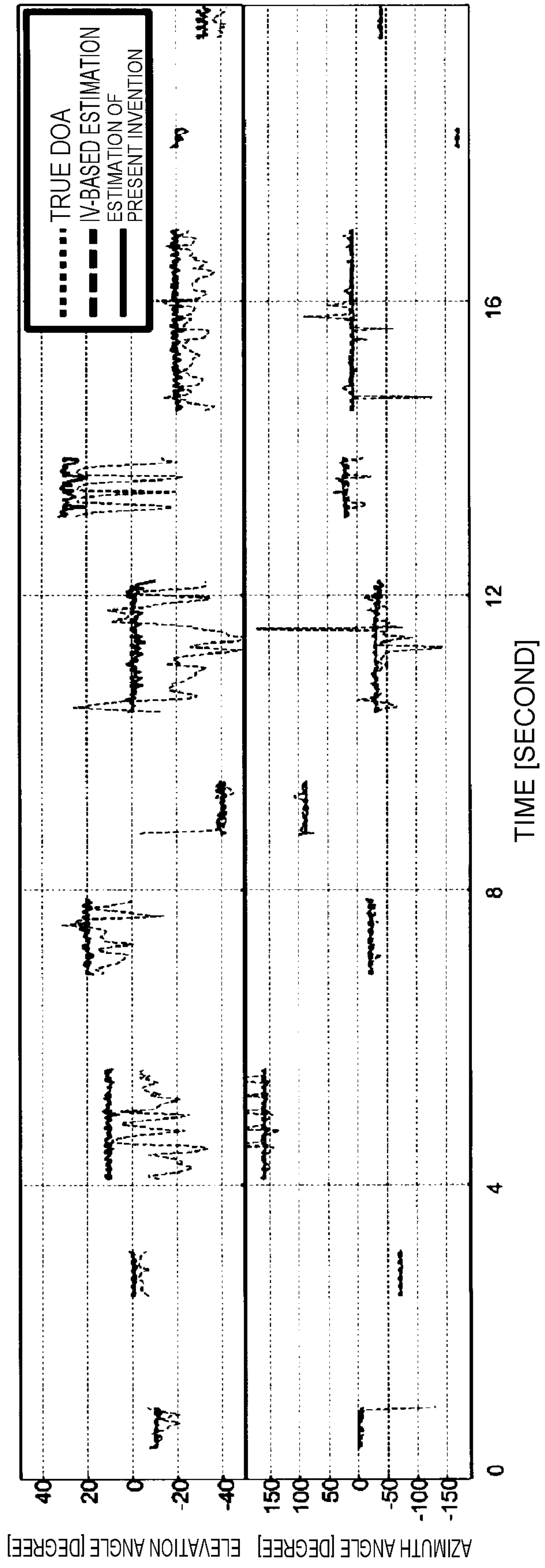
FIG. 5 is a diagram illustrating an estimation result of the direction-of-arrival estimation device of the embodiment 1 and an estimation result of prior art.

FIG. 5 illustrates an experimental result of time series DOA estimation by the direction-of-arrival estimation device 2 of the present embodiment. FIG. 5 is a DOA estimation result having the time on a horizontal axis and the azimuth angle and the elevation angle on a vertical axis. It can be recognized that, compared to the result of the conventional method indicated with a broken line, the result by the present embodiment indicated with a solid line is clearly closer to the true DOA.

TABLE 1

| | DE | FR |
|---|---|---|
| Conventional method (Non-Patent Literature 6) | 10.5° | — |
| Model learning device 1 | 0.528° | 0.973 |

Table 1 indicates scores of the accuracy of the DOA estimation and sound source present section detection. EOAError (DE) indicates an error of the DOA estimation, a FrameRecall (FR) indicates an accuracy rate of the sound source present section detection, and they are evaluation measures similar to DCASE2019 Task 3 (Non-Patent Literatures 11 and 16). It illustrates that the DE is 1° or lower to be far greater than the conventional method, and the sound source present section detection is also performed with high accuracy. The results indicate that the direction-of-arrival estimation device 2 of the present embodiment is effectively operated.

Embodiment 2

The DOA estimation method which improves the accuracy of the DOA estimation based on the IV by using the noise suppression and the sound source separation using the DNN is disclosed. Generally, input signals x of the time domain when N pieces of sound sources are present can be indicated as follows.

[Math. 6]

$$x = \sum_{i=1}^{N} s_i + n + \epsilon \tag{10}$$

Here, $s_i$ is the direct sound of a sound source i∈[1, . . . , N], n is the noise uncorrelated to an object sound source, and ε is other terms (such as the reverberation) due to the object sound source. Since the object signals can be indicated as the sum of the elements even in the time-frequency domain, by applying the expression to Expression (3), the IV can be expressed as follows.

[Math. 7]

$$I_t = \sum_{f=1}^{F}\left(\sum_{i=1}^{N} I^{s_i}_{f,t} + I^{n}_{f,t} + I^{\epsilon}_{f,t}\right) \tag{11}$$

As described above, $I_t$ is the time series of the acoustic intensity vector (IV), $I^{si}_{f,t}$ is the direct sound component of a sound source i of the acoustic intensity vector (IV), $I^{n}_{f,t}$ is the noise component uncorrelated to the object sound source of the acoustic intensity vector (IV), and $I^{\epsilon}_{f,t}$ indicates the component (such as the reverberation) other than the direct sound due to the object sound source of the acoustic intensity vector (IV). As can be seen from Expression (11), since the IV obtained from the observed signals contain not only a certain sound source i but all the other components, the time series of the IV derived from here is affected by the terms. It is one of the causes of the property of being weak to decline of the SNR, which is the disadvantage of the conventional method based on the IV.

In order to overcome the disadvantage of the conventional method, it is assumed to take out the acoustic intensity vector $I^{si}$ of a sound source $S_i$ from N pieces of Traube's double sounds by performing the noise suppression and the sound source separation by multiplication of the time frequency mask and vector subtraction. It is known that, when it is considered that the respective elements of the expression (11) are sufficiently sparse on the time frequency space and overlap little, they can be separated by the time frequency mask (Reference Non-Patent Literature 1).

Reference Non-Patent Literature 1: O. Yilmaz and S. Rickard, "Blind separation of speech mixtures via time-frequency masking," IEEE Trans. Signal Process., vol. 52, pp. 1830-1847, July, 2004.

Actually it is a strong assumption, and it is impossible to assume that the noise terms n are sufficiently sparse on the time frequency space. Then, in the present embodiment, $M^{si}_{f,t}$ $(1-M^{n}_{f,t})$ which is a combination of a time frequency mask $M^{si}_{f,t}$ which separates the sound source $S_i$ and a time frequency mask $M^{n}_{f,t}$ which separates the noise terms n is used. The processing can be considered as the combination of two pieces of processing of the noise suppression and the sound source separation. In addition, in the case where the term z is the reverberation, it largely overlaps with the object signals on the time frequency and cannot be removed with the time frequency mask. Accordingly, in the present embodiment, $I^{\epsilon}_{f,t}$ is directly estimated and subtracted from the original acoustic intensity vector as the vector. The operations can be expressed as follows.

[Math. 8]

$$I_t^{s_i} = \sum_{f=1}^{F} M^{s_i}_{f,t} * \left(1 - M^{n}_{f,t}\right) * \left(I_{f,t} - \hat{I}^{\epsilon}_{f,t}\right) \tag{12}$$

Since the case where an overlap count of object sound present at the same time is 2 or smaller is handled in the present embodiment, $1-M^{s1}_{f,t}$ can be used instead of $M^{s2}_{f,t}$.

Accordingly, we estimate the time frequency masks $M^n_{f,t}$ and $M^{s1}_{f,t}$ and a vector $\hat{I}^{\varepsilon}_{f,t}$ using two DNNs.

<Model Learning Device 3>

Figure 6:
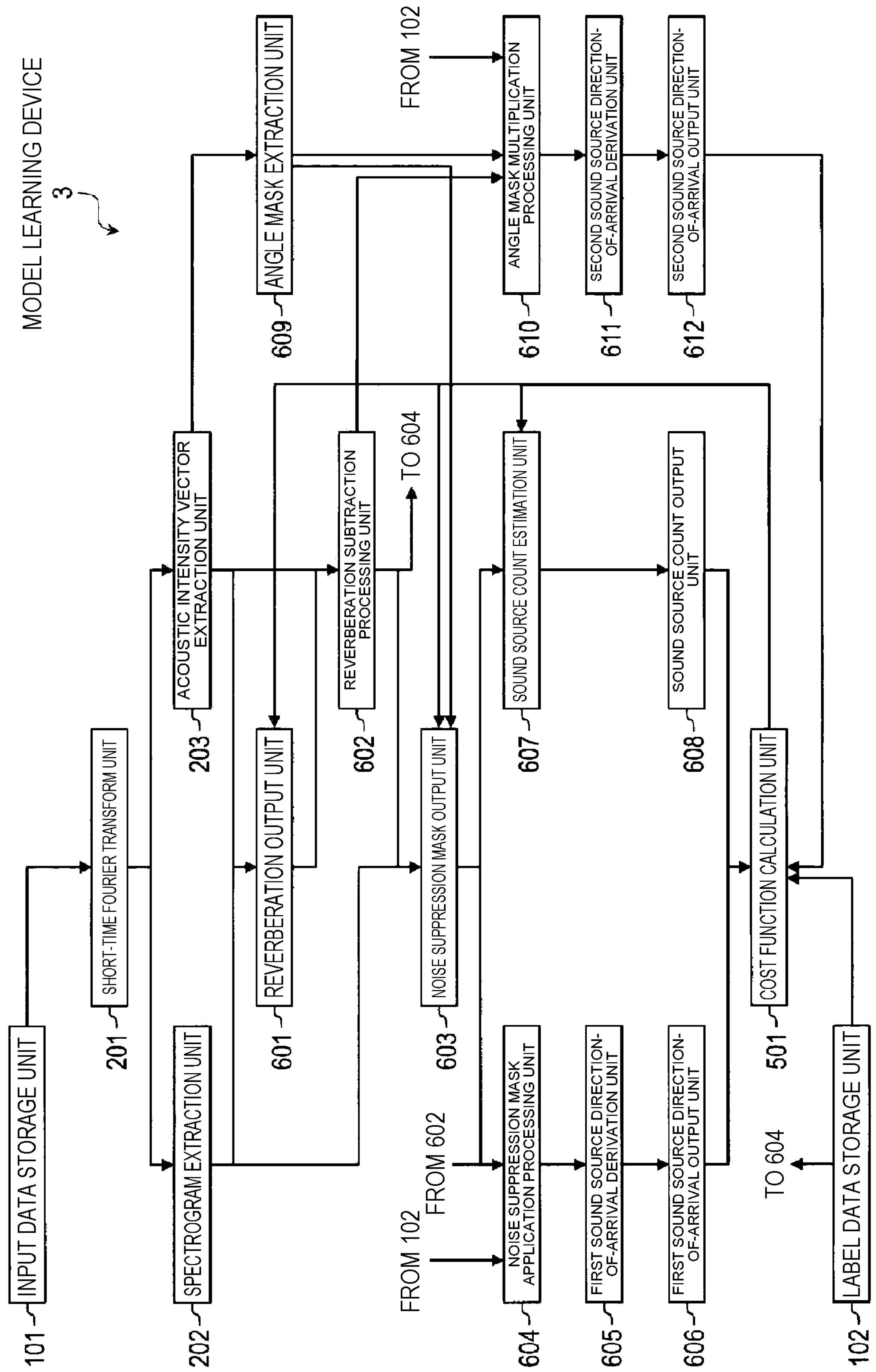
FIG. 6 is a block diagram illustrating a configuration of a model learning device of an embodiment 2.

Hereinafter, the functional configuration of the model learning device 3 of the embodiment 2 will be described with reference to FIG. 6. As illustrated in the figure, the model learning device 3 of the present embodiment includes the input data storage unit 101, the label data storage unit 102, the short-time Fourier transform unit 201, the spectrogram extraction unit 202, the acoustic intensity vector extraction unit 203, a reverberation output unit 601, a reverberation subtraction processing unit 602, a noise suppression mask output unit 603, a noise suppression mask application processing unit 604, a first sound source direction-of-arrival derivation unit 605, a first sound source direction-of-arrival output unit 606, a sound source count estimation unit 607, a sound source count output unit 608, an angle mask extraction unit 609, an angle mask multiplication processing unit 610, a second sound source direction-of-arrival derivation unit 611, a second sound source direction-of-arrival output unit 612, and the cost function calculation unit 501.

Figure 7:
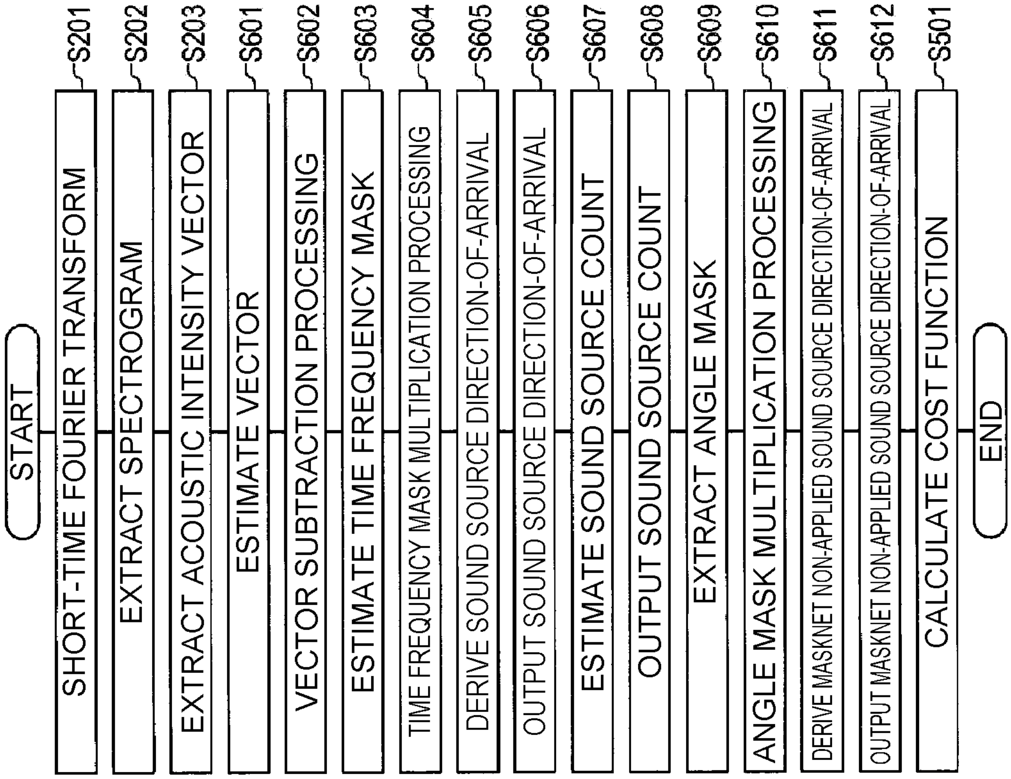
FIG. 7 is a flowchart illustrating an operation of the model learning device of the embodiment 2.

Hereinafter, the operations of the respective components will be described with reference to FIG. 7.

<Input Data Storage Unit 101>

As input data, 4-channel acoustic data of the first-order ambisonics B format to be used for learning, for which the sound source direction-of-arrival at each time is known, is prepared, and stored in the input data storage unit 101 beforehand. Note that, in a direction-of-arrival estimation device 4 to be described later, acoustic data for which the sound source direction-of-arrival is unknown is stored beforehand. The acoustic data to be used may be voice signals or may be acoustic signals other than voice signals. Note that the acoustic data to be used does not always need to be limited to the ambisonics form, and may be microphone array signals collected so as to extract the acoustic intensity vector. The acoustic data to be used may be acoustic signals collected by a microphone array for which microphones are arranged on a same spherical surface. Further, signals of the ambisonics form composed by addition and subtraction of the acoustic signals for which the sound which has arrived from up, down, left, right, front and back directions with a predetermined position as a reference is emphasized may be used. In this case, the signals of the ambisonics form may be composed using the technology described in Reference Patent Literature 1. In the present embodiment, the data for which the overlap count of the object sound present at the same time is 2 or smaller is used.

(Reference Patent Literature 1: Japanese Patent Laid-Open NO. 2018-120007)

<Label Data Storage Unit 102>

Label data indicating the sound source direction-of-arrival and the time of each acoustic event, which corresponds to the input data in the input data storage unit 101, is prepared and stored in the label data storage unit 102 beforehand.

<Short-Time Fourier Transform Unit 201>

The short-time Fourier transform unit 201 executes the STFT to the input data in the input data storage unit 101, and acquires a complex spectrogram (S201).

<Spectrogram Extraction Unit 202>

The spectrogram extraction unit 202 uses the complex spectrogram acquired in step S201, and extracts the real spectrogram to be used as the input feature amount of the DNN (S202). The spectrogram extraction unit 202 uses a log-mel spectrogram in the present embodiment.

<Acoustic Intensity Vector Extraction Unit 203>

The acoustic intensity vector extraction unit 203 uses the complex spectrogram obtained in step S201, and extracts the acoustic intensity vector to be used as the input feature amount of the DNN according to Expression (3) (S203).

<Reverberation Output Unit 601>

The reverberation output unit 601 receives input of the real spectrogram and the acoustic intensity vector, and outputs the estimated reverberation component of the acoustic intensity vector (S601). In more detail, the reverberation output unit 601 estimates the term $I^{\varepsilon}_{f,t}$ (the component other than the direct sound due to the object sound source of the acoustic intensity vector (IV), the reverberation component) in Expression (11) by a DNN model (VectorNet). In the present embodiment, the DNN model for which a multilayer CNN and a bidirectional long short-time memory recurrent neural network (Bi-LSTM) are combined is used.

<Reverberation Subtraction Processing Unit 602>

The reverberation subtraction processing unit 602 performs the processing of subtracting the $I^{\varepsilon}_{f,t}$ (the component other than the direct sound due to the object sound source of the acoustic intensity vector (IV), the reverberation component) estimated in step S601 from the acoustic intensity vector obtained in step S203 (S602).

<Noise Suppression Mask Output Unit 603>

The noise suppression mask output unit 603 executes the estimation and output of the time frequency mask for the noise suppression and the time frequency mask for the sound source separation (S603). The noise suppression mask output unit 603 estimates the time frequency masks $M^n_{f,t}$ and $M^{s1}_{f,t}$ for the noise suppression and the sound source separation by the DNN model (MaskNet). In the present embodiment, the DNN model having a structure similar to the reverberation output unit 601 (VectorNet) except the output unit is used.

<Noise Suppression Mask Application Processing Unit 604>

The noise suppression mask application processing unit 604 multiplies the time frequency masks $M^n_{f,t}$ and $M^{s1}_{f,t}$ obtained in step S603 with the acoustic intensity vector obtained in step S602. In more detail, the noise suppression mask application processing unit 604 uses Expression (12) to apply a time frequency mask ($M^{si}_{f,t}$ $(1\text{-}M^n_{f,t})$) formed of a product of a time frequency mask $(1\text{-}M^n_{f,t})$ for which the time frequency mask ($M^n_{f,t}$) for the noise suppression is subtracted from 1 and the time frequency mask ($M^{si}_{f,t}$) for the sound source separation to a reverberation-component-subtracted acoustic intensity vector ($I_{f,t}-\hat{I}^{\varepsilon}_{f,t}$).

However, in the case where a sound source count at the certain time is 1, it is $M^{s1}_{f,t}=1$. Information of the sound source count is obtained from the label data in the label data storage unit 102 in the model learning device 3, and from the sound source count output unit 608 to be described later in the direction-of-arrival estimation device 4 to be described later.

<First Sound Source Direction-Of-Arrival Derivation Unit 605>

The first sound source direction-of-arrival derivation unit 605 derives the sound source direction-of-arrival (DOA) by Expression (6), based on the processing-applied acoustic intensity vector obtained in step S604.

<First Sound Source Direction-Of-Arrival Output Unit 606>

The first sound source direction-of-arrival output unit 606 outputs the time series data of the pair of the azimuth angle $\varphi$ and the elevation angle $\theta$, which is the sound source direction-of-arrival (DOA) derived in step S605 (S606).

<Sound Source Count Estimation Unit 607>

The sound source count estimation unit 607 estimates the sound source count by a DNN model (NoasNet) (S607). In the present embodiment, the Bi-LSTM layer or lower of the noise suppression mask output unit 603 (MaskNet) is branched and turned to the NoasNet.

<Sound Source Count Output Unit 608>

The sound source count output unit 608 outputs the sound source count estimated by the sound source count estimation unit 607. The sound source count output unit 608 outputs the sound source count in a form of a three-dimensional One-Hot vector corresponding to three states 0, 1 and 2 of the sound source count. The sound source count output unit 608 defines the state having a largest value as the output of the sound source count at the time.

<Angle Mask Extraction Unit 609>

The angle mask extraction unit 609 derives an azimuth angle $\varphi^{ave}$ of the object sound source by Expression (6) in the state of not performing the noise suppression and the sound source separation based on the acoustic intensity vector obtained in step S203, and extracts an angle mask $M^{angle}{}_{f,t}$ which selects the time frequency bin having the azimuth angle larger than the azimuth angle $\varphi^{ave}$ (S609). In the case where two main sound sources are included in input sound, the $M^{angle}{}_{f,t}$ is a coarse sound source separation mask. In the present embodiment, the angle mask is used to derive the input feature amount of the DNN (MaskNet) and a regularization term of the cost function.

<Angle Mask Multiplication Processing Unit 610>

The angle mask multiplication processing unit 610 multiplies the angle mask $M^{angle}{}_{f,t}$ obtained in step S609 with the reverberation-subtracted acoustic intensity vector obtained in step S602 (S610). However, in the case where the sound source count at the certain time is 1, it is $M^{angle}{}_{f,t}=1$. The information of the sound source count is obtained from the label data in the label data storage unit 102.

<Second Sound Source Direction-Of-Arrival Derivation Unit 611>

The second sound source direction-of-arrival derivation unit 611 derives the sound source direction-of-arrival (DOA) by Expression (6) using the processing-applied acoustic intensity vector obtained in step S610 (S611).

<Second Sound Source Direction-Of-Arrival Output Unit 612>

The second sound source direction-of-arrival output unit 612 outputs the time series data of the pair of the azimuth angle $\varphi$ and the elevation angle $\theta$, which is the DOA derived in step S611. However, differently from step S606, the DOA is obtained without using the output of the noise suppression mask output unit 603 (MaskNet), and is also called a MaskNet non-applied sound source direction-of-arrival. The output is used to derive the regularization term in the cost calculation unit 501 to be described later.

<Cost Function Calculation Unit 501>

The cost function calculation unit 501 calculates the cost function of the DNN learning using the output of steps S606, S608, and S612 and Second sound source direction-of-arrival output unit 612 and the label data in the label data storage unit 102, and updates the parameter of the DNN model in the direction where the cost function becomes small (S501). In the present embodiment, the following cost function is used.

$$L=L^{DOA}+\lambda_1 L^{NOAS}+\lambda_2 L^{DOA'} \quad (13)$$

Here, $L^{DOA}$, $L^{NOAS}$ and $L^{DOA'}$ are the DOA estimation, Noas estimation and the regularization term respectively, and $\lambda_1$ and $\lambda_2$ are positive constants. The $L^{DOA}$ is the Mean Absolute Error (MAE) between the true DOA and the estimated DOA obtained as the output of step S606, and the $L^{NOAS}$ is the Binary Cross Entropy (BCE) between a true Noas and the estimated Noas obtained as the output of step S608. The $L^{DOA'}$ is calculated similarly to the $L^{DOA}$ using the output of S612 instead of the output of S606.

<Stop Condition>

Steps S601-S608 and S501 are repeatedly executed until a stop condition is satisfied. Though the stop condition is not specified in the present flowchart, in the present embodiment, learning is stopped when the DNN parameter is updated for 120000 times for example.

<Direction-Of-Arrival Estimation Device 4>

Figure 8:
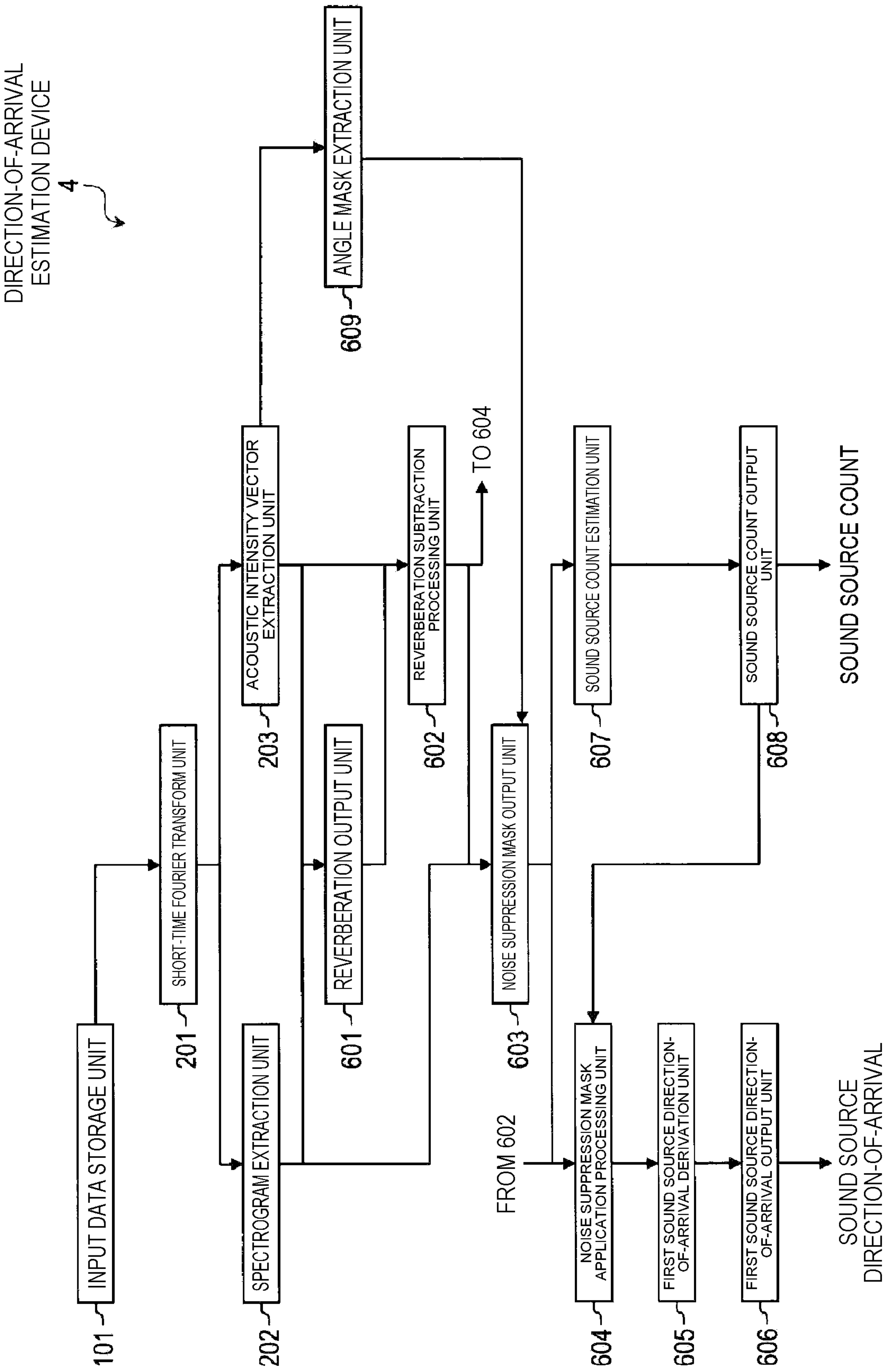
FIG. 8 is a block diagram illustrating a configuration of a direction-of-arrival estimation device of the embodiment 2.
Figure 9:
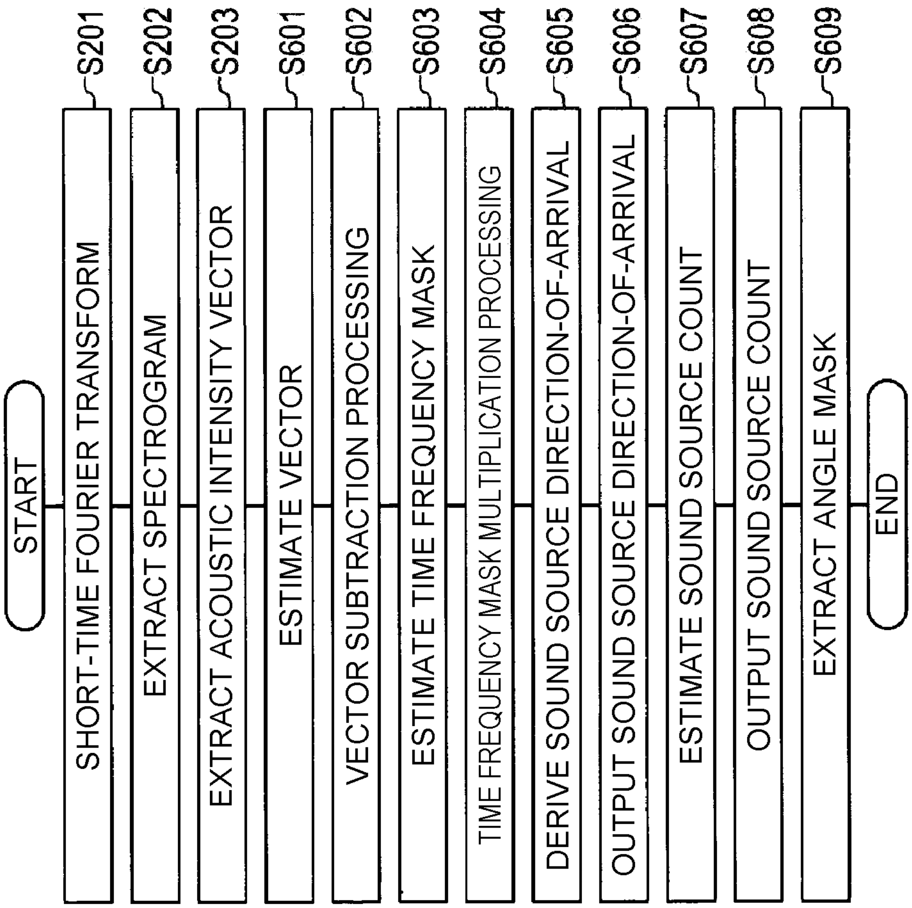
FIG. 9 is a flowchart illustrating an operation of the direction-of-arrival estimation device of the embodiment 2.

FIG. 8 illustrates the functional configuration of the direction-of-arrival estimation device 4. As illustrated in the figure, the direction-of-arrival estimation device 4 of the present embodiment configured such that the angle mask multiplication processing unit 610, the second sound source direction-of-arrival derivation unit 611, the second sound source direction-of-arrival output unit 612, the cost function calculation unit 501 and the label data storage unit 102, which are the components relating to parameter update, are omitted from the functional configuration of the model learning device 3. The operation of the device is, as illustrated in FIG. 9, such that steps S610, S611, S612, and S501 relating to the parameter update are eliminated among the operations of the model learning device 3.

<Execution Result Example>

Figure 10:
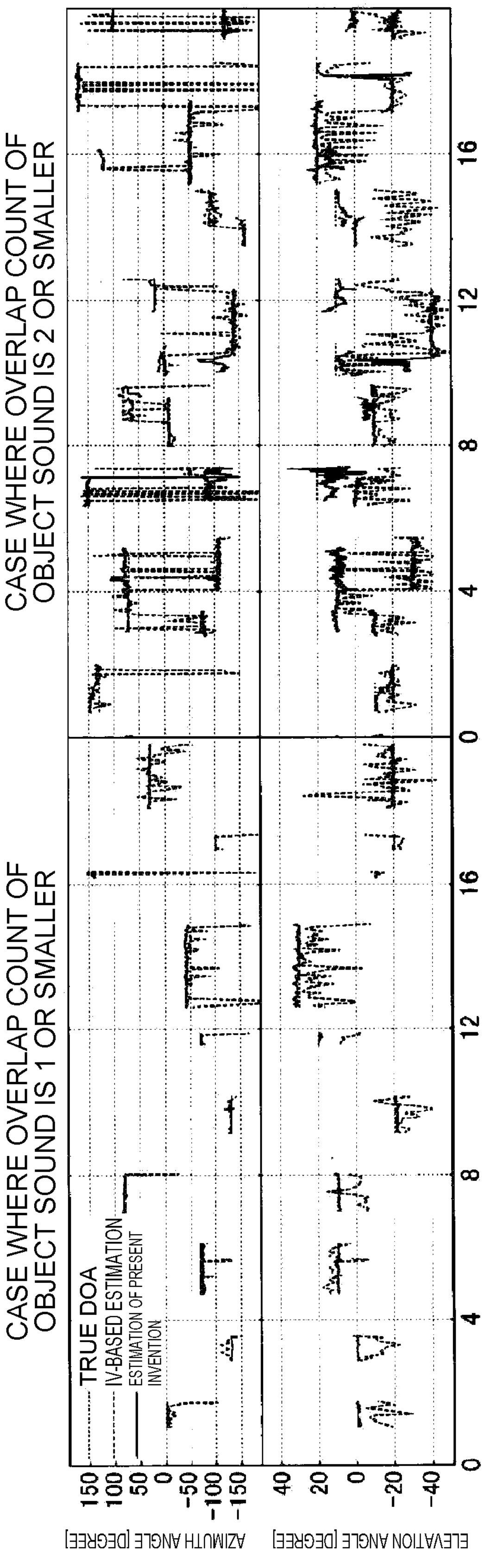
FIG. 10 is a diagram illustrating an estimation result of the direction-of-arrival estimation device of the embodiment 2 and the estimation result of the prior art.

The experimental result of performing the time series DOA estimation by the present embodiment is indicated. FIG. 10 is the DOA estimation result having the time on the horizontal axis and the azimuth angle and the elevation angle on the vertical axis. The DOA estimation result by the conventional IV-based method is indicated with the broken line, and the result by the present embodiment is indicated with the solid line. It shows that the result is clearly closer to the true DOA by applying Expression (12) to the IV. Table 2 indicates scores of accuracy of the DOA estimation and the Noas estimation.

TABLE 2

| | DE | FR |
|---|---|---|
| Conventional method (Reference Non-Patent Literature 2) | 2.7° | 0.908 |
| Model learning device 3 | 2.2° | 0.956 |

Reference Non-Patent Literature 2: K. Noh, J. Choi, D. Jeon, and J. Chang, "Three-stage approach for sound event localization and detection," in Tech. report of Detection and Classification of Acoustic Scenes and Events 2019 (DCASE) Challenge, 2019.

The DOAError (DE) indicates an error of the DOA estimation, and the FrameRecall (FR) indicates the accuracy rate of the Noas estimation, and they are the evaluation measures similar to DCASE2019 Task 3 (Non-Patent Literatures 11 and 16).

The conventional method (Reference Non-Patent Literature 2) is a model which has achieved the highest DOA estimation accuracy in DCASE2019 Task 3. It shows that a highest performance is achieved at a value lower than that of the conventional method for the DE. The high accuracy is achieved also for the FR. The results indicate that the direction-of-arrival estimation device 4 of the present embodiment is effectively operated.

APPENDIX

The device of the present invention includes, as a single hardware entity for example, an input unit to which a keyboard or the like is connectable, an output unit to which a liquid crystal display or the like is connectable, a communication unit to which a communication device (a communication cable for example) communicable to the outside of the hardware entity is connectable, a CPU (Central Processing Unit, may be provided with a cash memory or a register or the like), a RAM and a ROM which are memories, an external storage device which is a hard disk, and a bus which connects the input unit, the output unit, the communication unit, the CPU, the RAM, the ROM and the external storage device so as to exchange data. In addition, the hardware entity may be provided with a device (drive) capable of reading and writing a recording medium such as a CD-ROM or the like as needed. An example of a physical entity provided with such hardware resources is a general purpose computer.

In the external storage device of the hardware entity, programs to be needed in order to achieve the functions described above and data to be needed in the processing of the programs or the like are stored (without being limited to the external storage device, the programs may be stored in the ROM which is a read-only storage device for example). Further, the data obtained by the processing of the programs or the like is appropriately stored in the RAM and the external storage device or the like.

In the hardware entity, the individual program stored in the external storage device (or the ROM or the like) and the data needed for the processing of the individual program are read to the memory as needed, and appropriately interpreted, executed and processed in the CPU. As a result, the CPU achieves the predetermined function (the individual component expressed as some unit or some means or the like described above).

The present invention is not limited by the embodiments described above and can be appropriately changed without deviating from the scope of the present invention. In addition, the processing described in the embodiments described above is not only executed time sequentially according to the described order but may be also executed in parallel or individually according to throughput of the device which executes the processing or as needed.

As already described, in the case of achieving the processing function in the hardware entity (the device of the present invention) described in the embodiments above, by a computer, processing content of the function that the hardware entity should have is described by the program. Then, by executing the program in the computer, the processing function in the above-described hardware entity is achieved on the computer.

Figure 11:
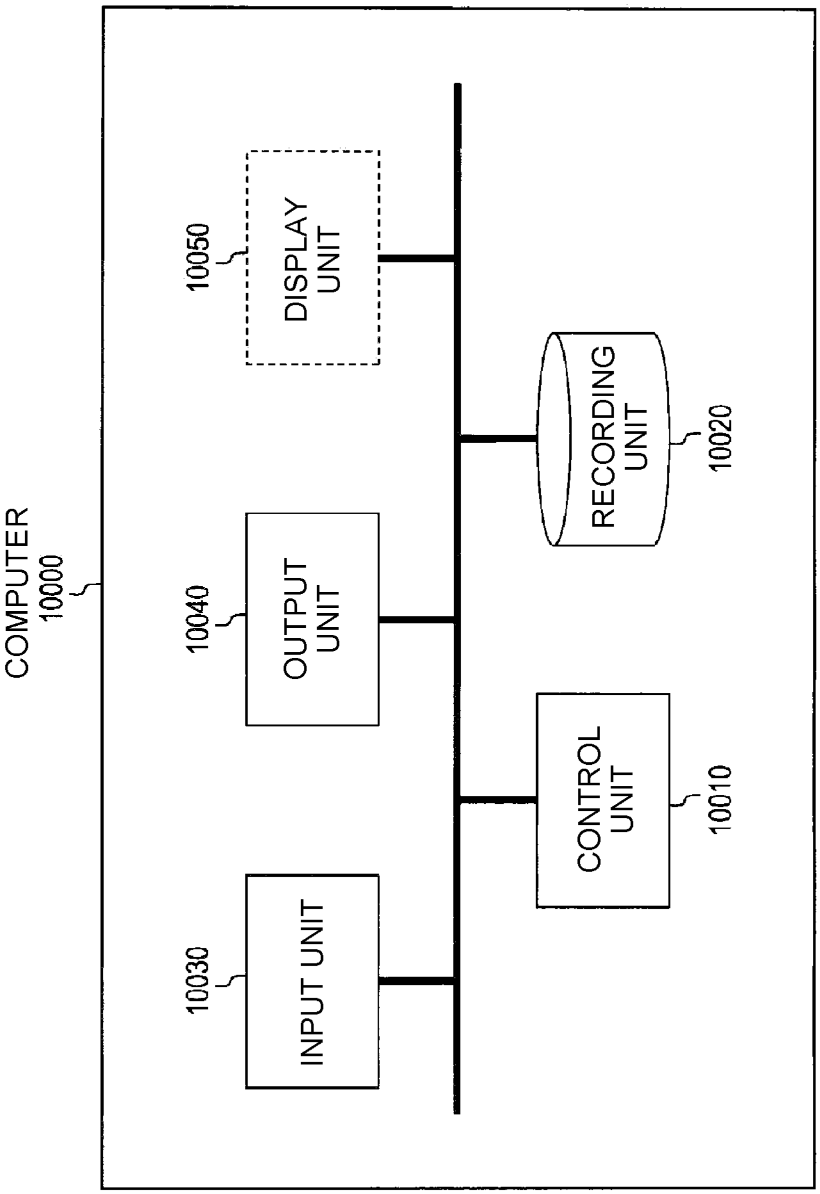
FIG. 11 is a diagram illustrating a functional configuration example of a computer.

The various kinds of processing described above can be implemented by making a recording unit 10020 of the computer illustrated in FIG. 11 read the program that makes each step of the above-described method be executed, and making a control unit 10010, an input unit 10030 and an output unit 10040 or the like perform the operations.

The program describing the processing content can be recorded in a computer-readable recording medium. The computer-readable recording medium may be anything such as a magnetic recording device, an optical disk, a magneto-optical recording medium, or a semiconductor memory. Specifically, for example, a hard disk device, a flexible disk or a magnetic tape or the like can be used as the magnetic recording device, a DVD (Digital Versatile Disc), a DVD-RAM (Random Access Memory), a CD-ROM (Compact Disc Read Only Memory) or a CD-R (Recordable)/RW (ReWritable) or the like can be used as the optical disk, an MO (Magneto-Optical disc) or the like can be used as the magneto-optical recording medium, and an EEP-ROM (Electrically Erasable and Programmable-Read Only Memory) or the like can be used as the semiconductor memory.

In addition, the program is distributed by selling, assigning or lending a portable recording medium such as a DVD or a CD-ROM in which the program is recorded or the like. Further, the program may be distributed by storing the program in a storage device of a server computer and transferring the program from the server computer to another computer via a network.

Such a computer which executes the program tentatively stores the program recorded in the portable recording medium or the program transferred from the server computer in its own storage device first, for example. Then, when executing the processing, the computer reads the program stored in its own recording medium, and executes the processing according to the read program. In addition, as a different execution form of the program, the computer may directly read the program from the portable recording medium and execute the processing according to the program, and may further execute the processing according to the received program successively every time the program is transferred from the server computer to the computer. In addition, the processing described above may be executed by a so-called ASP (Application Service Provider) type service which achieves the processing function only by the execution instruction and result acquisition without transferring the program to the computer from the server computer. Note that the program in the present embodiment includes information which is used for the processing by an electronic computer and is equivalent to the program (the data which is not a direct command to the computer but has the property of defining the processing of the computer or the like).

Further, while the hardware entity is configured by making the predetermined program be executed on the computer, at least part of the processing content may be achieved in a hardware manner.

The invention claimed is:

1. A direction-of-arrival estimation device comprising a processor configured to execute a method comprising:

receiving input of a real spectrogram extracted from a complex spectrogram of acoustic data and an acoustic intensity vector extracted from the complex spectrogram;

generating an estimated reverberation portion of the acoustic intensity vector;

receiving input of the real spectrogram and the acoustic intensity vector from which the reverberation portion has been subtracted;

generating a time frequency mask for noise suppression; and determining a sound source direction-of-arrival based on an acoustic intensity vector formed by applying the time frequency mask to the acoustic intensity vector from which the reverberation portion has been subtracted.

2. The direction-of-arrival estimation device according to claim 1, the processor further configured to execute a method comprising:

estimating the reverberation portion of the acoustic intensity vector based on a deep neural network-based reverberation portion estimation model of a sound pressure intensity vector; and estimating the time frequency mask based on a deep neural network-based time frequency mask estimation model for noise suppression.

3. The direction-of-arrival estimation device according to claim 1, the processor further configured to execute a method comprising:

estimating and outputting a time frequency mask for sound source separation in addition to the time frequency mask for the noise suppression; and determining the sound source direction-of-arrival based on an acoustic intensity vector formed by applying a time frequency mask formed of a product of a time frequency mask formed by subtracting the time frequency mask for the noise suppression from 1 and the time frequency mask for the sound source separation to the acoustic intensity vector from which the reverberation portion has been subtracted.

4. The direction-of-arrival estimation device according to claim 1, wherein the spectrogram includes a log-mel spectrogram.

5. The direction-of-arrival estimation device according to claim 1, wherein the generating an estimated reverberation portion of the acoustic intensity vector uses a deep neural network model that combines a multilayer convolutional neural network and a bidirectional long short-time memory recurrent neural network.

6. The direction-of-arrival estimation device according to claim 1, wherein the acoustic data is collected by a microphone array including a plurality of microphones arranged on a spherical surface.

7. The direction-of-arrival estimation device according to claim 1, wherein the generating the estimated reverberation portion uses a first deep neural network to estimate the reverberation portion of the acoustic pressure intensity vector, wherein the generating the time frequency mask for noise suppression uses a second deep neural network to estimate the time frequency mask for noise suppression, and wherein the determining the sound source direction-of-arrival uses a third deep neural network to estimate presence of a sound source.

8. A model learning device comprising a processor configured to execute a method comprising:

receiving input of a real spectrogram extracted from a complex spectrogram of acoustic data for which a sound source direction-of-arrival is known and which has a label indicating the sound source direction-of-arrival at each time and an acoustic intensity vector extracted from the complex spectrogram;

generating an estimated reverberation portion of the acoustic intensity vector;

receiving input of the real spectrogram and the acoustic intensity vector from which the reverberation portion has been subtracted;

generating a time frequency mask for noise suppression;

determining a sound source direction-of-arrival based on an acoustic intensity vector formed by applying the time frequency mask to the acoustic intensity vector from which the reverberation portion has been subtracted; and updating a parameter used for the association based on the derived sound source direction-of-arrival and the label.

9. The model learning device according to claim 8, the processor further configured to execute a method comprising:

estimating the reverberation portion of the acoustic intensity vector based on a deep neural network-based reverberation portion estimation model of a sound pressure intensity vector; and estimating the time frequency mask based on a deep neural network-based time frequency mask estimation model for noise suppression.

10. The model learning device according to claim 8, the processor further configured to execute a method comprising:

estimating a sound source count;

estimating and outputting a time frequency mask for sound source separation in addition to the time frequency mask for the noise suppression;

determining the sound source direction-of-arrival based on an acoustic intensity vector formed by applying a time frequency mask formed of a product of a time frequency mask formed by subtracting the time frequency mask for the noise suppression from 1 and the time frequency mask for the sound source separation to the acoustic intensity vector from which the reverberation portion has been subtracted; and updating a parameter used for the association based on the sound source count in addition to the derived sound source direction-of-arrival and the label.

11. The model learning device according to claim 8, wherein the spectrogram includes a log-mel spectrogram.

12. The model learning device according to claim 8, wherein the generating an estimated reverberation portion of the acoustic intensity vector uses a deep neural network model that combines a multilayer convolutional neural network and a bidirectional long short-time memory recurrent neural network.

13. The model learning device according to claim 8, wherein the acoustic data is collected by a microphone array including a plurality of microphones arranged on a spherical surface.

14. The model learning device according to claim 8, wherein the generating the estimated reverberation portion uses a first deep neural network to estimate the reverberation portion of the acoustic pressure intensity vector, wherein the generating the time frequency mask for noise suppression uses a second deep neural network to estimate the time frequency mask for noise suppression, and wherein the determining the sound source direction-of-arrival uses a third deep neural network to estimate presence of a sound source.

15. A direction-of-arrival estimation method comprising:

receiving input of a real spectrogram extracted from a complex spectrogram of acoustic data and an acoustic intensity vector extracted from the complex spectrogram;

outputting an estimated reverberation portion of the acoustic intensity vector;

receiving input of the real spectrogram and the acoustic intensity vector from which the reverberation portion has been subtracted;

outputting a time frequency mask for noise suppression; and determining a sound source direction-of-arrival based on an acoustic intensity vector formed by applying the time frequency mask to the acoustic intensity vector from which the reverberation portion has been subtracted.

16. The direction-of-arrival estimation method according to claim 15, the method further comprising:

estimating the reverberation portion of the acoustic intensity vector based on a deep neural network-based reverberation portion estimation model of a sound pressure intensity vector; and estimating the time frequency mask based on a deep neural network-based time frequency mask estimation model for noise suppression.

17. The direction-of-arrival estimation method according to claim 15, the method further comprising:

estimating a sound source count;

estimating and outputting a time frequency mask for sound source separation in addition to the time frequency mask for the noise suppression;

determining the sound source direction-of-arrival based on an acoustic intensity vector formed by applying a time frequency mask formed of a product of a time frequency mask formed by subtracting the time frequency mask for the noise suppression from 1 and the time frequency mask for the sound source separation to the acoustic intensity vector from which the reverberation portion has been subtracted; and updating a parameter used for the association based on the sound source count in addition to the derived sound source direction-of-arrival and the label.

18. The direction-of-arrival estimation method according to claim 15, wherein the generating an estimated reverberation portion of the acoustic intensity vector uses a deep neural network model that combines a multilayer convolutional neural network and a bidirectional long short-time memory recurrent neural network.

19. The direction-of-arrival estimation method according to claim 15, wherein the spectrogram includes a log-mel spectrogram, and wherein the acoustic data is collected by a microphone array including a plurality of microphones arranged on a spherical surface.

20. The direction-of-arrival estimation method according to claim 15, wherein the generating the estimated reverberation portion uses a first deep neural network to estimate the reverberation portion of the acoustic pressure intensity vector, wherein the generating the time frequency mask for noise suppression uses a second deep neural network to estimate the time frequency mask for noise suppression, and wherein the determining the sound source direction-of-arrival uses a third deep neural network to estimate presence of a sound source.

* * * * *